United States Patent
Just et al.

(10) Patent No.: US 8,398,146 B2
(45) Date of Patent: Mar. 19, 2013

(54) METHOD OF JOINING A BACKLIGHT COVER AND HEADLINER CLIP FOR A CONVERTIBLE TOP

(75) Inventors: Jan Just, Bloomfield Hills, MI (US); Robert E. Fallis, III, Rochester, MI (US)

(73) Assignee: Magna Car Top Systems GmbH, Rochester Hills, MI (US)

(*) Notice: Subject to any disclaimer, the term of this patent is extended or adjusted under 35 U.S.C. 154(b) by 0 days.

(21) Appl. No.: 13/130,661

(22) PCT Filed: Nov. 25, 2009

(86) PCT No.: PCT/US2009/065846
§ 371 (c)(1),
(2), (4) Date: Nov. 8, 2011

(87) PCT Pub. No.: WO2010/062926
PCT Pub. Date: Jun. 3, 2010

(65) Prior Publication Data
US 2012/0045272 A1 Feb. 23, 2012

Related U.S. Application Data

(60) Provisional application No. 61/118,279, filed on Nov. 26, 2008.

(51) Int. Cl.
*B60J 7/12* (2006.01)
(52) U.S. Cl. .................................................. 296/107.07
(58) Field of Classification Search ............. 296/107.06, 296/146.14, 214, 107.07
See application file for complete search history.

(56) References Cited

U.S. PATENT DOCUMENTS
6,152,518 A * 11/2000 Schonenbach ........... 296/107.06
* cited by examiner

*Primary Examiner* — Joseph Pape
(74) *Attorney, Agent, or Firm* — Brooks Kushman P.C.

(57) ABSTRACT

A convertible top has a convertible top cover, a backlight, and a headliner. A connector system includes a molded ring of material affixed to the backlight and the top cover. The connector system includes a clip attached to the headliner. The molded ring may have a slot formed on an interior surface between the backlight and the cover. The clip may be inserted into the slot to secure the headliner insider the top cover. A method of securing a headliner to a convertible top is also provided.

9 Claims, 4 Drawing Sheets

US 8,398,146 B2

METHOD OF JOINING A BACKLIGHT COVER AND HEADLINER CLIP FOR A CONVERTIBLE TOP

CROSS-REFERENCE TO RELATED APPLICATION

This application is the U.S. national phase of PCT Application No. PCT/US2009/065846 filed Nov. 25, 2009 which claims the benefit of U.S. provisional application Serial No. 61/118,279 filed Nov. 26, 2008, the disclosure of which is incorporated in its entirety by reference herein.

BACKGROUND OF THE INVENTION

1. Field of the Invention

The present invention relates to the manufacture of a convertible top wherein a backlight, top cover, and headliner are joined by an in situ molded elastomeric ring.

2. Background Art

Convertible tops are generally provided with a backlight that is connected around the periphery of the backlight to a flexible fabric cover. The backlight may be connected to the cover by gluing, fastener clips, or elastomeric rings that may be separately formed or molded to the backlight and cover.

Convertible tops including a headliner are preferred because they reduce noise and improve the overall appearance of the convertible top. Assembling a headliner to a convertible top is complicated by the need to secure the headliner to the backlight and the cover. Additional assembly steps and fasteners are required to secure the headliner to the top around the periphery of the backlight.

The problem addressed by Applicants' invention is reducing the complexity of assembling a headliner to a convertible top.

SUMMARY OF THE INVENTION

According to one embodiment, the present disclosure provides a connector system for a convertible top cover, a backlight, and a headliner. The connector system includes a molded ring of material. The molded ring is affixed to the backlight and the top cover. The ring defines a slot formed on an interior surface of the ring between the backlight and the top cover. The connector system also includes a ring shaped clip. The clip is attached to the headliner. The clip is inserted into the slot to secure the headliner inside the cover.

According to other aspects of the present disclosure, the clip may be provided with one or more barbs to engage a side of the slot. The clip may include a flange to which the headliner is attached.

According to one embodiment, a connector system is provided for a convertible top cover, a backlight, and a headliner. The connector system includes a molded ring affixed to the backlight and an opening in the convertible top cover. The connector system includes a ring shaped member that is insert molded into the molded ring. The member is molded into the molded ring between the backlight and the opening in the top cover. The connector system includes a retainer clip. The clip is secured to the headliner. The clip is assembled to the ring shaped member inside the cover.

According to another embodiment, the present disclosure provides a method of securing a headliner to a convertible top. The method includes providing a backlight and a top cover to the mold. The top cover defines an opening for receiving the backlight. A ring of material is molded around the periphery of the backlight and to the opening defined by the top cover. A slot is formed in the ring between the periphery of the backlight and the opening. A ring shaped clip is attached to the headliner to assemble the headliner to the ring by inserting the clip into the slot.

DETAILED DESCRIPTION OF THE PREFERRED EMBODIMENT(S)

Figure 1:
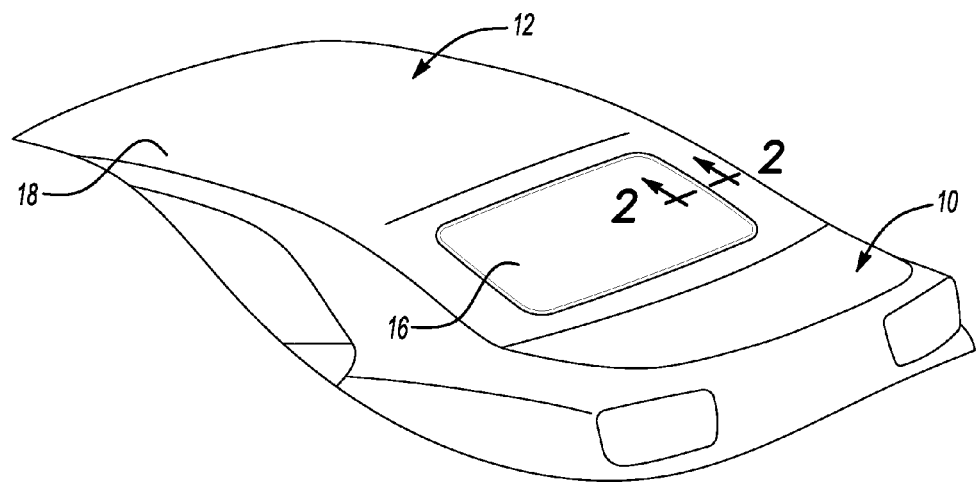
FIG. 1 is a fragmentary rear perspective view of a vehicle that is provided with a convertible top.

Referring to FIG. 1, a vehicle 10 is shown that includes a convertible top 12. A backlight 16, also referred to as a rear window, is provided as part of the convertible top 12 and is secured to a flexible cover 18 portion of the convertible top 12.

Figure 2:
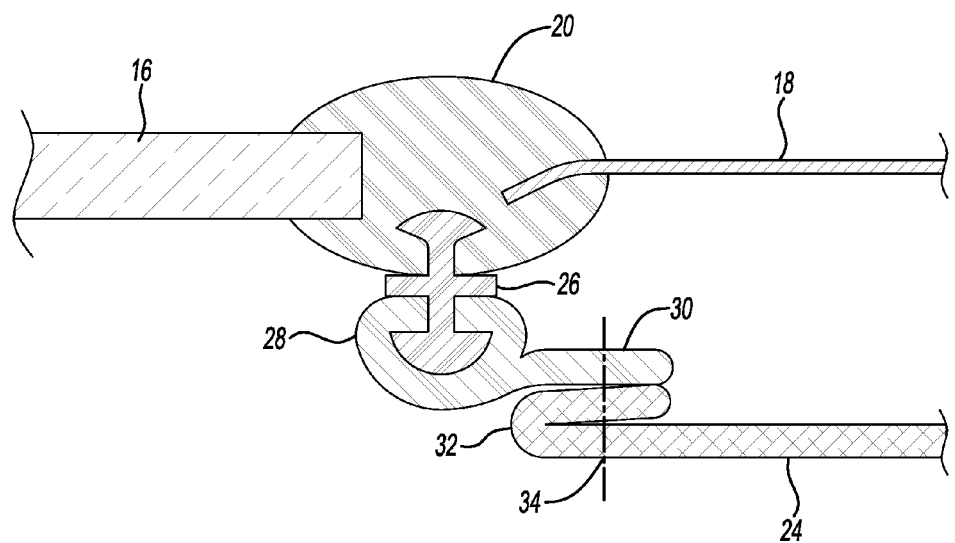
FIG. 2 is a cross-sectional view taken along the line 2-2 in FIG. 1.

Referring to FIG. 2, an in situ molded elastomeric ring 20 is shown joining the backlight 16 and the cover 18. A headliner 24 is secured to the convertible top inside the flexible cover 18. The headliner 24 is secured to a retainer ring insert 26 by a headliner attachment clip 28. The headliner attachment clip 28 includes a flange 30 that is secured to a hem 32 of the headliner 24 at a stitch line 34.

Figure 3:
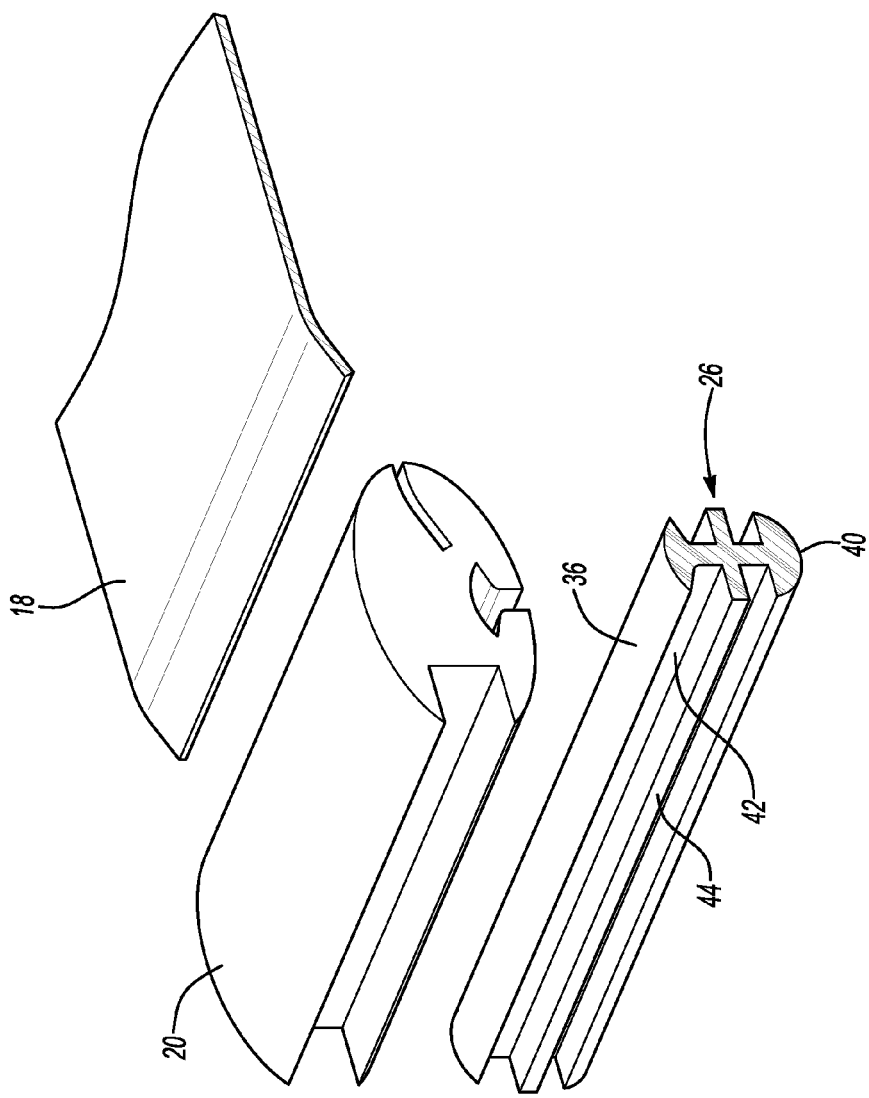
FIG. 3 is a fragmentary perspective view showing the orientation of a backlight, cover and headliner clip with an elastomeric ring that joins them together in phantom.

Referring to FIG. 3, the retainer ring insert 26 is shown in greater detail with the backlight 16 and flexible cover 18 shown juxtaposed to the retainer ring insert 26 with the elastomeric ring 20 being shown in phantom. The retainer ring insert 26 has an anchoring T-rib 36 around which the elastomeric ring 20 is molded in situ. The retainer ring insert 26 is an insert in the elastomeric ring 20 that is formed in an insert molding process. The edges of the backlight 16 and flexible cover 18 are also insert molded into the elastomeric ring 20. The elastomeric ring 20 is formed in a triple insert mold process. The elastomeric ring 20 extends around the entire periphery of the backlight 16 to form a continuous in situ molded elastomeric ring 20 that connects the backlight 16 to the cover 18 and the retainer ring insert 26. The retainer ring insert 26 is preferably formed in the continuous ring that is outboard of, but generally conforms to, the periphery of the backlight 16.

The retainer ring insert 26 has a headliner clip receiver 40 that is disposed at the opposite end of a body portion 42. An intermediate flange 44 extends outwardly from the intermediate area of the body portion 42. The intermediate flange 44 is used to support the retainer ring insert 26 during the molding process as will be described more fully below.

Figure 4:
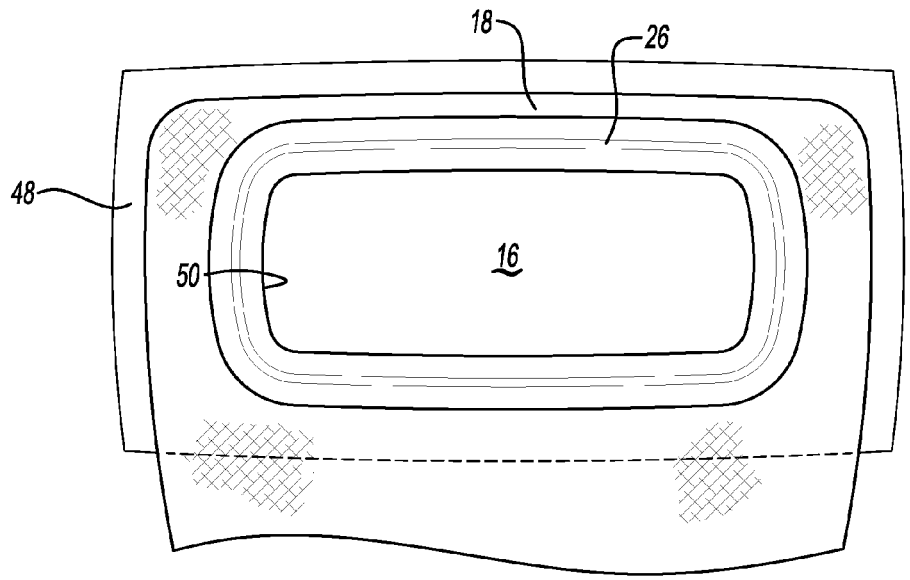
FIG. 4 is a plan view of a mold showing the backlight headliner clip and cover in a position to be joined together in an in situ elastomeric molding process.

Referring to FIG. 4, a lower mold 48 is shown in plan view with the cover partially shown overlying the lower mold 48.

The backlight 16 is placed in the mold with the retainer ring insert 26 disposed in the mold outboard of the peripheral edge 50 of the backlight 16. FIG. 4 illustrates the lower mold 48 with the backlight 16, cover 18 and retainer ring insert 26 in place prior to beginning the molding process.

Figure 5:
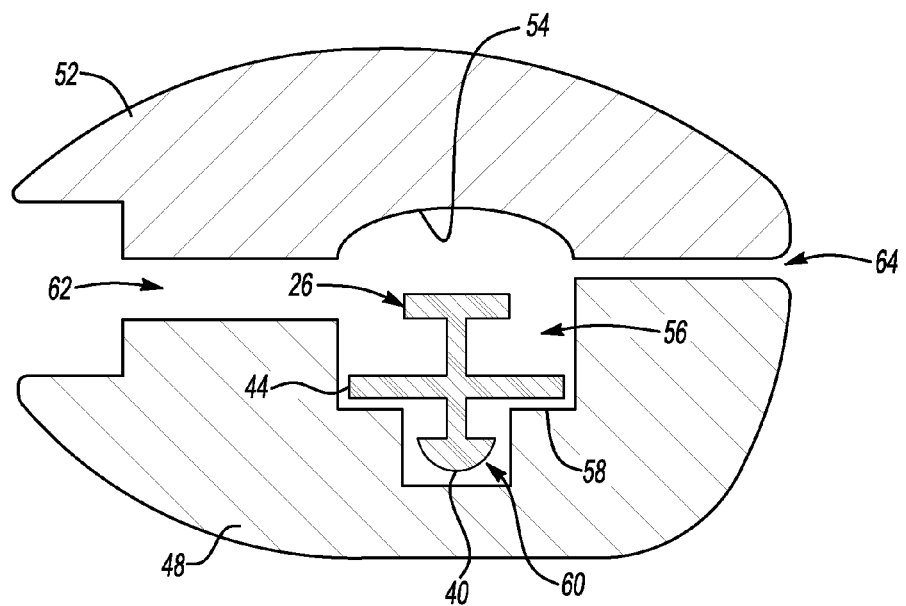
FIG. 5 is a fragmentary cross-sectional view of a mold with a headliner clip loaded into the mold.

Referring to FIG. 5, the lower mold 48 is shown with an upper mold 52 in a position for molding and closing the lower mold 48. A recess 54 is formed in the upper mold 52 that forms the outer surface of the elastomeric insert 20. A groove 56 is provided in the lower mold 48 for receiving the retainer ring insert 26. A pair of shoulders 58 are defined within the groove 56. The intermediate flange 44 supports the retainer ring insert 26 on the shoulders 58 prior to and during the molding process. A clearance groove 60 is provided for the headliner clip receiver 40. The intermediate flange 44 seals the clearance groove 60 during the molding process to keep the headliner clip receiver 40 from being molded over during the molding process. A glass receiving space 62 and a cover receiving space 64 are provided between the lower mold 48 and the upper mold 52.

The molding process for the embodiment of FIGS. 1-5 will be described below. The upper mold 52 is separated from the lower mold 48. The backlight 16, retainer ring insert 26 and flexible cover 18 are placed on the lower die 48 generally shown in FIG. 4. The upper mold 52 is then located on the lower mold 48 and clamped in place. Molten elastomer is then injected into the mold cavity defined between the lower mold 48 and the upper mold 52 completely filling the ring-shaped space defined around the peripheral edge 50 of the backlight 16. A groove 56 is completely filled with the elastomer except for the clearance groove 60. The in situ molded elastomeric ring 20 joins the backlight to the cover and also to the retainer ring insert 26. The elastomeric ring 20 is then permitted to cure and bond to the backlight 16, flexible cover 18 and the retainer ring insert 26.

Figure 6:
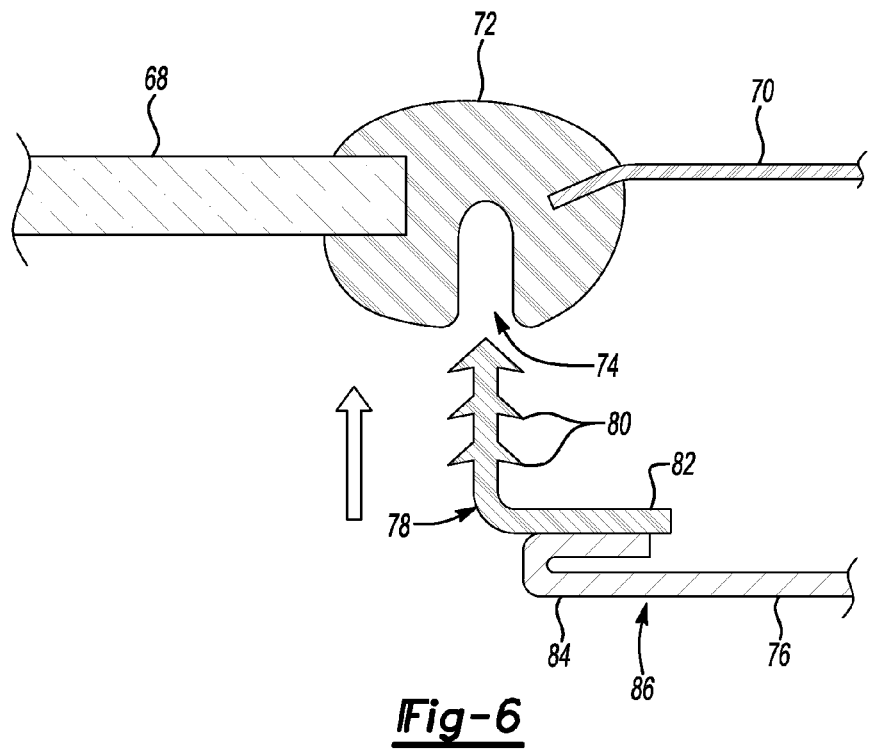
FIG. 6 is a fragmentary cross-sectional view of an alternative embodiment of an in situ formed elastomeric ring joining a backlight to a top cover and defining a headliner clip receptacle with a headliner and clip shown exploded away from the elastomeric ring.

Referring to FIG. 6, an alternative embodiment is shown in which a backlight 68 is joined to a cover 70 of a convertible top by an in situ molded elastomeric ring 72. The elastomeric ring 72 defines a groove 74. A headliner 76 is connected by a press-in connector ring 78 that is received in the groove 74. A plurality of anchoring barbs 80 are provided on the press-in connector 78 to securely retain the connector 78 in the groove 74. The press-in connector has a flange 82 that is joined to a hem 84 of the headliner 76. The hem 84 is connected to the flange 82 at a stitch line 86.

Figure 7:
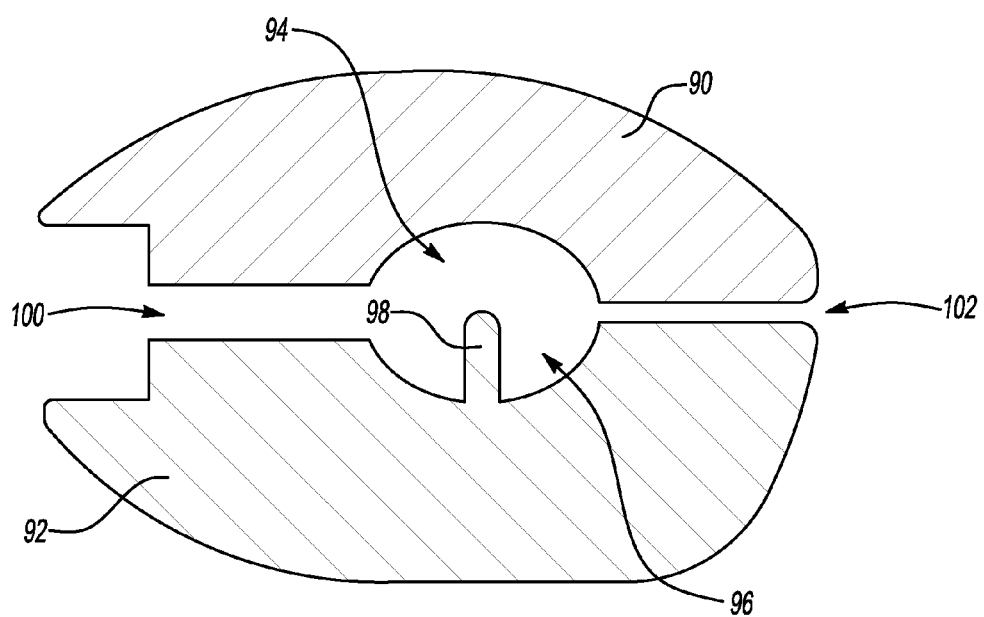
FIG. 7 is a fragmentary cross-sectional view of a mold that may be used to form the elastomeric ring shown in FIG. 6.

Referring to FIG. 7, a mold for forming the embodiment of FIG. 6 is shown to include an upper mold 90 and a lower mold 92 that are placed together during the molding process. An upper mold cavity 94 is defined by the upper mold 90. A lower mold cavity 96 is defined by the lower mold 92. A groove forming lip 98 is provided in the lower mold cavity 96 for forming the groove 74 in the elastomeric ring 72. A glass receiving space 100 is provided between the upper mold 90 and the lower mold 92. A cover receiving space 102 is defined between the upper mold 90 and the lower mold 92.

The method of assembling the headliner 76 to the convertible top according to the embodiment of FIGS. 6 and 7 is described below. The backlight 68 and cover 70 are loaded into a die similar to that shown in FIG. 4, but without the retainer ring insert 26. The upper mold 90 is closed over the lower mold 92 and clamped together. Molten elastomer is then injected into the upper mold cavity 94 and lower mold cavity 96 filling the cavity except for the area of the groove forming rib 98. The elastomer forming the ring 72 is permitted to partially cure and the upper mold 90 is removed from the lower mold 92. The headliner 76 is secured to the ring 72 by inserting the press-in connector 78 into the groove 74. The anchoring barbs 80 prevent removal of the press-in connector from the groove 74 after insertion. It should be understood that the press-in connector 78 is an elongated member that circumscribes the backlight 68 in a continuous ring. Alternatively, the press-in connector 78 may be formed in a series of segments that extend around the backlight 68. But, with either embodiment, the headliner should be attached without wrinkles While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A connector system for a convertible top cover, a backlight, and a headliner, comprising:
   a molded ring of material affixed to the backlight and the top cover, wherein the ring defines a slot formed on an interior surface of the ring between the backlight and the cover;
   a retainer ring that is assembled to the slot in the molded ring; and
   an attachment clip is attached to the headliner that circumscribes the backlight and is assembled to the retainer ring to secure the headliner to the top cover.

2. The connector system of claim 1 wherein the slot includes first and second sides that engage the ring shaped clip.

3. The connector system of claim 1 wherein the clip includes a plurality of barbs formed on a inner side and an outer side of the clip that engage a first side and a second side of the slot.

4. The connector of claim 1 wherein the clip has a flange to which the headliner is attached.

5. A connector system for a convertible top cover, a backlight, and a headliner, comprising:
   a molded ring affixed to the backlight and an opening in the top cover;
   a retainer ring insert that is insert molded into the molded ring between the backlight and the opening in the top cover; and
   an attachment clip that is secured to the headliner and is assembled to the ring shaped member.

6. The connector system of claim 5 wherein a head portion of the retainer ring insert protrudes from the molded ring, the attachment clip is secured to the head portion, and a flange is provided as part of the attachment clip that is secured to a hem of the headliner.

7. The connector system of claim 5 wherein the retainer ring insert includes an anchoring T-rib around which the molded ring is molded in situ.

8. The connector system of claim 5 wherein the retainer ring insert further includes a body portion that extends between an anchoring T-rib and a head portion, wherein an intermediate flange is provided on the body portion between the anchoring T-rib and the head portion, wherein the intermediate flange extends outwardly from opposite sides of the body portion to support the attachment clip as the ring shaped member is insert molded into the molded ring.

9. The connector system of claim 5 wherein the backlight has a peripheral edge that is encapsulated by the molded ring.

* * * * *